(12) United States Patent
Behr et al.

(10) Patent No.: US 7,491,287 B2
(45) Date of Patent: Feb. 17, 2009

(54) BONDING METHOD WITH FLOWABLE ADHESIVE COMPOSITION

(75) Inventors: Andrew Behr, Littleton, CO (US); Eumi Pyun, Austin, TX (US); Victoria A. Russell, Brooklyn Park, MN (US); William J. Schultz, North Oaks, MN (US); Terry L. Smith, Roseville, MN (US); Wendy L. Thompson, Roseville, MN (US); Stephen Znameroski, Eagan, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 239 days.

(21) Appl. No.: 11/423,191

(22) Filed: Jun. 9, 2006

(65) Prior Publication Data

US 2007/0295446 A1    Dec. 27, 2007

(51) Int. Cl.
*B29C 65/00* (2006.01)

(52) U.S. Cl. .............. 156/272.2; 156/296; 156/330; 523/168

(58) Field of Classification Search .............. 156/272.2, 156/275.5, 296, 330; 523/168
See application file for complete search history.

(56) References Cited

U.S. PATENT DOCUMENTS

| | | | |
|---|---|---|---|
| 2,801,185 A | 7/1957 | Iler | |
| 3,018,262 A | 1/1962 | Schroeder | |
| 3,117,099 A | 1/1964 | Proops et al. | |
| 3,729,313 A | 4/1973 | Smith | |
| 3,741,769 A | 6/1973 | Smith | |
| 3,808,006 A | 4/1974 | Smith | |
| 3,855,145 A * | 12/1974 | Vossos | 516/34 |
| 3,914,017 A | 10/1975 | Bedell et al. | |
| 3,996,187 A | 12/1976 | Travnicek | |
| 3,996,189 A | 12/1976 | Travnicek | |
| 4,008,198 A | 2/1977 | Krohberger et al. | |
| 4,250,053 A | 2/1981 | Smith | |
| 4,279,717 A | 7/1981 | Eckberg et al. | |
| 4,330,590 A | 5/1982 | Vesley | |
| 4,394,403 A | 7/1983 | Smith | |
| 4,418,165 A | 11/1983 | Polmanteer et al. | |
| 4,455,205 A | 6/1984 | Olson et al. | |
| 4,478,876 A | 10/1984 | Chung | |
| 4,486,504 A | 12/1984 | Chung | |
| 4,491,508 A | 1/1985 | Olson et al. | |
| 4,494,403 A | 1/1985 | Bowers et al. | |
| 4,522,958 A | 6/1985 | Das et al. | |
| 4,526,910 A * | 7/1985 | Das et al. | 523/220 |
| 4,737,559 A | 4/1988 | Kellen et al. | |
| 5,037,579 A | 8/1991 | Matchett | |
| 5,074,632 A | 12/1991 | Potter | |
| 5,086,086 A | 2/1992 | Brown-Wensley et al. | |
| 5,252,694 A | 10/1993 | Willett et al. | |
| 5,258,225 A | 11/1993 | Katsamberis | |
| 5,307,438 A | 4/1994 | Bilkadi et al. | |
| 5,343,544 A * | 8/1994 | Boyd et al. | 385/46 |
| 5,360,659 A | 11/1994 | Arends et al. | |
| 5,373,035 A | 12/1994 | Uemura et al. | |
| 5,545,676 A | 8/1996 | Palazzotto et al. | |
| 5,648,407 A | 7/1997 | Goetz et al. | |
| 5,666,223 A | 9/1997 | Bennett et al. | |
| 5,668,198 A | 9/1997 | Suhadolnik et al. | |
| 5,668,199 A | 9/1997 | Suhadolnik et al. | |
| 5,679,794 A | 10/1997 | Suhadolnik et al. | |
| 5,696,210 A | 12/1997 | King et al. | |
| 5,753,346 A | 5/1998 | Leir et al. | |
| 5,832,149 A | 11/1998 | Omizu et al. | |
| 5,874,143 A | 2/1999 | Peloquin et al. | |
| 5,897,727 A | 4/1999 | Staral et al. | |
| 5,910,522 A * | 6/1999 | Schmidt et al. | 523/168 |
| 6,045,269 A | 4/2000 | Watanabe et al. | |
| 6,049,419 A | 4/2000 | Wheatley et al. | |
| 6,123,890 A | 9/2000 | Mazurek et al. | |
| 6,166,212 A | 12/2000 | Galbo et al. | |
| 6,180,200 B1 * | 1/2001 | Ha et al. | 428/64.1 |
| 6,196,730 B1 | 3/2001 | Hammar | |
| 6,277,485 B1 | 8/2001 | Invie et al. | |
| 6,416,838 B1 | 7/2002 | Arney et al. | |
| 6,465,645 B1 | 10/2002 | Wood et al. | |
| 6,497,957 B1 | 12/2002 | Border et al. | |
| 6,518,353 B2 | 2/2003 | Border et al. | |
| 6,593,392 B2 | 7/2003 | Wang | |
| 6,620,907 B2 | 9/2003 | Mader | |
| 6,652,158 B2 | 11/2003 | Bartur et al. | |
| 6,706,403 B1 * | 3/2004 | Olofson et al. | 428/413 |

(Continued)

FOREIGN PATENT DOCUMENTS

| | | |
|---|---|---|
| DE | 42 17 553 | 12/1993 |
| EP | 0 292 331 | 11/1988 |
| JP | 06-73358 | 3/1994 |
| WO | WO 84/03837 | 10/1984 |
| WO | WO 00/06495 | 2/2000 |
| WO | WO 00/06661 | 2/2000 |
| WO | WO 02/39168 | 5/2002 |
| WO | WO 2005/066672 | 7/2005 |

OTHER PUBLICATIONS

Van Krevelen, D.W., "Properties of Polymers; Their Correlation with Chemical Structure; Their Numerical Estimation and Prediction from Additive Group Contributions", 1990, 3rd Edition, Elsevier Science Publishers B.V., Chapter 7, pp. 189-225.

U.S. Application entitled "Concurrently Curable Hybrid Adhesive Composition", filed Oct. 26, 2005, having U.S. Appl. No. 11/259,515.

*Primary Examiner*—John L Goff
*Assistant Examiner*—Daniel McNally
(74) *Attorney, Agent, or Firm*—Jean A. Lown

(57) ABSTRACT

A method of bonding a first article to a second article is provided. The method involves the use of a flowable, adhesive composition that contains non-aggregated, surface-modified silica nanoparticles dispersed in an epoxy resin.

20 Claims, No Drawings

U.S. PATENT DOCUMENTS

| | | |
|---|---|---|
| 6,838,142 B2 | 1/2005 | Yang et al. |
| 6,887,917 B2 | 5/2005 | Yang et al. |
| 6,949,297 B2 | 9/2005 | Yang et al. |
| 7,005,229 B2 | 2/2006 | Nirmal et al. |
| 7,053,133 B2 | 5/2006 | Yamaguchi et al. |
| 7,071,263 B2 | 7/2006 | Cheng et al. |
| 2003/0031438 A1 | 2/2003 | Kambe et al. |
| 2003/0218258 A1* | 11/2003 | Charles et al. ............... 257/783 |
| 2004/0067450 A1 | 4/2004 | Leatherdale et al. |
| 2004/0068023 A1 | 4/2004 | Leatherdale et al. |
| 2005/0004246 A1 | 1/2005 | Palazzotto et al. |
| 2005/0066672 A1 | 3/2005 | Yamamoto et al. |
| 2005/0124712 A1 | 6/2005 | Anderson et al. |
| 2005/0284181 A1 | 12/2005 | Smith et al. |
| 2006/0134362 A1 | 6/2006 | Lu et al. |

* cited by examiner

BONDING METHOD WITH FLOWABLE ADHESIVE COMPOSITION

BACKGROUND

There are several commercially available adhesives with sufficient optical clarity for use in optical applications such as those involving an optical fiber bonded to another optical fiber. Many of these optically clear adhesives, however, have a high coefficient of thermal expansion. That is, when subjected to varying temperatures, the optical fibers can move relative to each other resulting in a loss in the transmission efficiency.

There are several commercially available adhesives that have a low coefficient of thermal expansion. Many of these adhesives having a low coefficient of thermal expansion are filled with conventional fillers, which tend to increase the haze and decrease the transparency of the adhesive. These adhesives are not optically clear and are not suitable for many optical applications.

SUMMARY OF THE INVENTION

A method of bonding a first article to a second article is provided. The method can be used, for example, to form a bond in optical applications where thermal stability and mechanical strength are needed. The bond usually is optically clear, allows transmission at wavelengths typically used for communication applications (e.g., 800 to 1650 nanometers), and has a low coefficient of thermal expansion.

The method of bonding includes preparing a flowable adhesive composition, positioning the adhesive composition between a first article and a second article, and curing the adhesive composition in the presence of actinic radiation to bond the first article to the second article. Preparing the flowable adhesive composition includes surface modifying silica nanoparticles by providing a surface modification mixture containing (a) silica nanoparticles, (b) a silane surface modifying agent having hydrolysable groups, (c) water in an amount such that the number of moles of water present in the surface modification mixture is greater than the number of moles of hydrolysable groups, and (d) an optional water-miscible solvent. Preparing the flowable adhesive composition further includes heating the surface modification mixture to at least 50° C. to form non-aggregated, surface-modified silica nanoparticles having surface-modifier covalently attached to the silica nanoparticles, forming a dispersion containing (i) the non-aggregated, surface-modified silica nanoparticles and (ii) an epoxy resin, removing at least most of the water and the optional water-miscible solvent, and adding a cationic photoinitiator after the removing step.

The above summary of the present invention is not intended to describe each disclosed embodiment or every implementation of the present invention. The Detailed Description and Examples that follow more particularly exemplify these embodiments.

DETAILED DESCRIPTION OF THE INVENTION

A method is provided for bonding a first article to a second article. The method involves the preparation of a flowable adhesive composition containing non-aggregated, surface-modified silica nanoparticles dispersed in an epoxy resin. The flowable adhesive composition is cured in the presence of actinic radiation to form a bond that has a low coefficient of thermal expansion and that can be used in optical applications. For example, the method can be used for bonding a first optical fiber to a second optical fiber, bonding an optical fiber or array of optical fibers to an optical device such as an optical waveguide, optical splitter, or optical sensor, or bonding an optical fiber or optical device to a substrate.

As used herein, the term "flowable adhesive composition" refers to an adhesive composition that can be dispensed by conventional means such as by a syringe or pump. For example, the flowable adhesive composition containing 50 to 75 weight percent silica nanoparticles typically has a viscosity no greater than 80 Pascal seconds (80,000 centipoise), no greater than 50 Pascal seconds (50,000 centipoise), no greater than 20 Pascal seconds (20,000 centipoise), no greater than 10 Pascal seconds (10,000 centipoise), no greater than 5 Pascal seconds (5,000 centipoise), or no greater than 3 Pascal seconds (3,000 centipoise). The flowable adhesive composition is not a gel.

The adhesive composition contains surface-modified silica nanoparticles. As used herein, the term "silica nanoparticles" refer to silica particles having an average diameter no greater than 500 nanometers. The term "diameter" refers not only to the diameter of substantially spherical particles but also to the longest dimension of non-spherical particles. The average particle size can be determined using any suitable analytical method such as transmission electron microscopy or photon correlation spectroscopy.

In many embodiments, the average diameter of the silica nanoparticles is no greater than 200 nanometers, no greater than 175 nanometers, no greater than 150 nanometers, no greater than 125 nanometers, or no greater than 100 nanometers. The average diameter of the silica nanoparticles is typically at least 1 nanometer, at least 2 nanometers, at least 5 nanometers, at least 10 nanometers, or at least 20 nanometers. The average diameter is often in the range of 1 to 200 nanometers, 1 to 150 nanometers, 1 to 100 nanometers, 10 to 200 nanometers, 10 to 150 nanometers, or 10 to 100 nanometers. Because the wavelengths of light used in many optical applications are longer than the diameter of the silica nanoparticles (e.g., the wavelengths are often 10 to 20 times longer than the average diameter of the silica nanoparticles), the silica nanoparticles typically do not scatter the light. More particularly, the silica nanoparticles usually allow high transmission of visible and infrared wavelengths of light through the adhesive.

Suitable silica nanoparticles are often available in the form of a sol, which is a colloidal dispersion of amorphous silica nanoparticles in a liquid medium. The sol can be a hydrosol with water as the liquid medium, an organosol with an organic solvent as the liquid medium, or a mixed sol with a combination of water and an organic solvent as the liquid medium. Methods of making sols are described, for example, in U.S. Pat. No. 2,801,185 (Iler), U.S. Pat. No. 4,522,958 (Das et al.), and U.S. Pat. No. 5,648,407 (Goetz et al.) as well as in R. K. Iler, *The Chemistry of Silica*, John Wiley & Sons, New York (1979). It is usually desirable that the silica nanoparticles in the sol have a relatively uniform size (i.e., diameter) and remain non-aggregated.

As used herein, the term "non-aggregated" means that the silica nanoparticles or the surface-modified silica nanoparticles are substantially free of aggregated nanoparticles, which refers to clusters or clumps or nanoparticles that are firmly associated with one another and that can typically only be separated with high shear. Particle aggregation can result in precipitation, gellation, a substantial viscosity increase, or light scattering. The adhesive compositions are flowable, in part, due to the absence or low incidence of aggregated silica nanoparticles. Less than 2 weight percent, less than 1 weight percent, less than 0.5 weight percent, or less than 0.2 weight percent of the silica nanoparticles in the adhesive composition are aggregated. Preferably, no aggregated silica nanoparticles can be detected in the cured adhesive compositions using a technique such as transmission electron microscopy.

Silica hydrosols can be prepared, for example, by partially neutralizing an aqueous solution of an alkali metal silicate with an acid or with a cation exchange resin in an acidic form. For example, the pH can be adjusted to about 8 or 9 such that the resulting sodium content is less than about 1 weight percent calculated as sodium oxide. Other methods of preparing silica hydrosols include electrolysis, ion exchange of sodium silicate, hydrolysis of silicon compounds, and dissolution of elemental silicon.

Silica hydrosols are commercially available in a variety of particle sizes and concentrations from Nyacol Products, Inc. (Ashland, Md.), Nalco Chemical Co. (Naperville, Ill.), and DuPont Chemical Co. (Wilmington, Del.). The concentration of silica nanoparticles is often in the range of 10 to 50 weight percent based on the weight of the hydrosol. Concentrations of silica nanoparticles in the range of 30 to 50 weight percent based on the weight of the hydrosol are often preferred because less water needs to be removed after surface modification.

The silica hydrosols are typically treated to remove any alkali metal ions (e.g., sodium or potassium ions) or alkaline earth ions (e.g., calcium or magnesium ions). The silica hydrosols can be treated, for example, with a cation exchange resin in the hydrogen form. Suitable cation exchange resins often have sulfonic acid functionality. One exemplary cation exchange resin is AMBERLITE IR-120H PLUS, which is commercially available from Alfa Aesar (Ward Hill, Mass.) or Sigma Aldrich (Milwaukee, Wis.). The alkali metal ions or alkaline earth ions can displace the hydrogen ions on the cation exchange resin resulting in a decrease in the pH of the silica hydrosol. The cation exchange resin can be removed by filtration and the pH can then be raised, if desired, with the addition of a base such as ammonium hydroxide. The addition of ammonium hydroxide is sometimes desirable because the ammonium ion can catalyze the reaction to the surface modification agent with the surface of the silica nanoparticle. Any excess ammonium hydroxide can be removed (e.g., volatilized) after surface modification of the silica nanoparticles along with the water and any optional water-miscible solvent.

The silica nanoparticles are surface modified with a silane surface modifying agent having hydrolysable groups. As used herein, a "hydrolysable group" refers to a group that can be reacted with water or a hydroxy group. A hydrolysable group is typically a halo group or an alkoxy group. That is, the silane often includes a trihalosilyl group or a trialkoxysilyl group. Hydroxy groups on the surface of the silica nanoparticles can react with the hydrolysable groups of the silane surface modifying agent resulting in the formation of a covalent bond. Alternatively, the hydrolysable groups of the silane surface modifying agent can react with water forming a silanol group, which can then react with the hydroxy group on the surface of the silica nanoparticles.

The silica nanoparticles are surface modified using a surface modification mixture that contains (a) silica nanoparticles, (b) a silane surface modifying agent having hydrolysable groups, (c) water in an amount such that the number of moles of water present in the mixture is greater than the number of moles of hydrolysable groups, and (d) an optional water-miscible solvent. After reaction with the surface modifying agent, the silica nanoparticles are typically non-aggregated and usually have a monolayer of the surface-modifier covalently attached to the surface.

Suitable silane surface modifying agents include, but are not limited to, alkyltrialkoxysilanes such as methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, butyltrimethoxysilane, butyltriethoxysilane, hexyltrimethoxysilane, n-octyltrimethoxysilane, n-octyltriethoxysilane, isooctyltrimethoxysilane, dodecyltrimethoxysilane, and octadecyltrimethoxysilane; aryltrialkoxysilanes such as styrylethyltrimethoxysilane, phenyltrimethoxysilane, phenyltriethoxysilane, and p-tolyltriethoxysilane; 3-glycidoxypropyltrialkoxysilane such as glycidoxypropyltrimethoxysilane; alkyltrichlorosilanes such as methyltrichlorosilane; aryltrichlorosilanes such as phenyltrichlorsilane, phenylethyltrichlorosilane, phenoxytrichlorosilane, and p-tolyltrichlorosilane; and combinations thereof.

The surface modifying agent is generally selected to provide a positive enthalpy of mixing for the dispersion containing the surface-modified silica nanoparticles and the epoxy resin. If the enthalpy of mixing is positive, the dispersion is typically stable. To ensure a positive enthalpy of mixing, the solubility parameter of the silane surface modifying agent can be matched to the solubility parameter of the epoxy resin. As an example, the materials can be selected such that the difference in these solubility parameters is no more than 4 $J^{1/2}$ $cm^{-3/2}$ and, preferably, no more than 2 $J^{1/2}$ $cm^{-3/2}$ as determined according to *Properties of Polymers; Their Correlation with Chemical Structure; Their Numerical Estimation and Prediction from Additive Group Contributions*, third edition, edited by D. W. Van Krevelen, Elsevier Science Publishers B.V., Chapter 7, 189-225 (1990).

There are several methods known to determine the solubility parameter of a material such as a silane modifying agent or epoxy resin. For example, there are several methods for theoretically estimating the solubility parameter of a material based on the additive contributions of functional groups as outlined in the above-cited reference. Alternatively, the solubility parameter of a material can be determined from measurements of the extent of equilibrium swelling of the material in a range of solvents of differing solubility parameters. The solubility parameters of the solvents themselves can be determined from their heats of evaporation. The solubility parameter $\delta$ is related to the cohesive energy $E_{coh}$ and the specific volume V by the relationship $\delta=(E_{coh}/V)^{1/2}$. For solvents of low molecular weight, the cohesive energy is closely related to the molar heat of evaporation $\Delta H_{vap}$ according to $E_{coh}=\Delta H_{vap}-p\Delta V=\Delta H_{vap}-RT$. Thus, $E_{coh}$ and $\delta$ can be calculated from the heat of evaporation of the solvent or from the course of the vapor pressure as a function of temperature. To determine the solubility parameter of the material, a plot of equilibrium swelling of the material vs. the solubility parameter of the solvents is generated. The solubility parameter of the material is defined as the point on this plot where maximum swelling is obtained. Swelling will be less for solvents having solubility parameters that are less than or greater than that of the material.

The surface modifying agent included in the surface modification mixture is usually present in an amount sufficient to provide an adhesive composition that contains silica nanoparticles that are substantially non-aggregated. That is, the adhesive composition is typically substantially free of aggregated silica nanoparticles. Transmission electron microscopy of the cured adhesive can be used to confirm that the silica nanoparticles are substantially non-aggregated.

Typically, the surface modifying agent included in the surface modification mixture is present in an amount sufficient to form a monolayer on the surface of the silica nanoparticles. The amount of surface modifying agent used can vary depending on the size of the silica nanoparticles. Smaller nanoparticles, which typically have a higher surface area and a higher surface to volume ratio, usually require a larger amount of the silane surface modifying agent. The surface modifying agent is often present in an amount up to 5 mmole surface modifying agent per gram of dry silica. For example the surface modifying agent can be present in an amount up 4 mmole, up to 3 mmole, up to 2 mmole, up to 1 mmole, or up to 0.5 mmole surface modifying agent per gram of dry silica.

The surface modification mixture contains water and an optional water-miscible solvent. Suitable optional water-miscible solvents include, but are not limited to, alcohols (e.g., methanol, ethanol, n-propanol, isopropanol, 1-methoxy-2-propanol, or butanol), ethers (e.g., diethyl ether or tetrahydrofuran), dimethylformamide, dimethylsulfoxide, acetonitrile, and the like. The optional water-miscible solvent is typically chosen to have a boiling point that allows removal at a temperature suitable for removal of the water.

In some embodiments, there is no optional water-miscible solvent in the surface-modification mixture. In other embodiments, the volume ratio of water to water-miscible solvent is at least 99:1 (i.e., 99 parts of water to 1 part water-miscible solvent), at least 98:2, at least 95:5, at least 90:10, at least 85:15, at least 80:20, at least 75:25, at least 70:30, at least 65:35, at least 60:40, at least 55:45, at least 50:50, at least 45:55, or at least 40:60. The optional water-miscible solvent can be used to increase the solubility of the surface modifying agent.

The surface modification mixture is typically heated at a temperature of at least 50° C. For example, the temperature can be at least 60° C., at least 70° C., at least 80° C., or at least 90° C. The temperature is usually maintained for at least one hour, at least 2 hours, at least 4 hours, at least 8 hours, at least 12 hours, at least 16 hours, or at least 20 hours. Some exemplary surface modification mixtures are heated at about 100° C. for about 24 hours. Suitable reaction conditions for covalently bonding the surface modification agent to the surface of the silica nanoparticles can vary depending on the presence or absence of a water-miscible solvent, the nature of the water-miscible solvent, and the presence or absence of a catalyst. Catalysts that can be used to accelerate the reaction include, but are not limited to, ammonia, amines and fluoride ions.

The surface-modified silica nanoparticles are dispersed in an epoxy resin. At least most of the water and optional water-miscible solvent in the surface-modification mixture is removed. The removal of the water and optional water-miscible solvent can occur either before or after addition of the epoxy resin (i.e., either before or after formation of the dispersion). Alternatively, some of the water and optional water-miscible solvent can be removed before addition of the epoxy resin with more removed after addition of the epoxy resin. The surface-modified silica nanoparticles typically remain non-aggregated after removal of the water and the optional water-miscible solvent.

In some embodiments, the water and optional water-miscible solvent are removed prior to addition of the epoxy resin (i.e., prior to formation of the dispersion). The surface modifying mixture can be heated to evaporate or distill the water and optional water-miscible solvent. In some embodiments, the surface-modified silica nanoparticles are dried to a powder. The dried surface-modified silica nanoparticles can then be combined with the epoxy resin using methods known in the art such as ball milling, three-roll milling, Brabender mixing, or other high shear mixing processes. Often the dried surface-modified silica nanoparticles are dispersed in a volatile solvent such as acetone prior to combination with the epoxy resin. The volatile solvent is typically removed from the epoxy-containing dispersion prior to addition of the photoinitiator using a rotary evaporator, by distillation, or any other suitable process.

In other embodiments, the water and optional water-miscible solvent are removed after addition of the epoxy resin using, for example, a rotary evaporator. The dispersion containing the surface-modified silica nanoparticles and epoxy resin is heated under vacuum to a temperature sufficient to remove even tightly bound water, the water-miscible solvent, and other volatiles such as solvents, ammonia, or the like. The temperature is selected to minimize polymerization of the epoxy resin. Other suitable methods of removing the water and optional water-miscible solvent include, but are not limited to, thin film evaporation, simple distillation, azeotropic distillation, or spray drying.

Suitable epoxy resins include monomeric or oligomeric epoxy compounds that can be aliphatic, alicyclic, aromatic, or heterocyclic. The terms "epoxy resin" and "epoxide" and "epoxy-containing material" are used interchangeably. These materials generally have, on the average, at least 1 polymerizable epoxy group per molecule. Some epoxy resins have at least 1.5 or at least 2 polymerizable epoxy groups per molecule. The oligomeric epoxides can be linear oligomers having terminal epoxy groups (for example, a diglycidyl ether of a polyoxyalkylene glycol), oligomers having skeletal epoxy units (for example, polybutadiene polyepoxide), or oligomers having pendant epoxy groups (for example, a glycidyl methacrylate oligomer or co-oligomer). The epoxides can be pure compounds or can be mixtures of compounds containing one, two, or more epoxy groups per molecule. These epoxy-containing materials can have a backbone of any type and with any suitable substituent group thereon that does not substantially interfere with cationic cure. Illustrative of permissible substituent groups include halogens, ester groups, ethers, sulfonate groups, siloxane groups, nitro groups, phosphate groups, and the like. The average molecular weight of the epoxy-containing materials can vary from about 58 g/mole to about 1000 g/mole or more.

Some useful epoxy-containing materials include those that contain cyclohexene oxide groups such as epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis(3,4-epoxy-6-methylcyclohexylmethyl)adipate. A more detailed list of useful epoxides of this nature is set forth in U.S. Pat. No. 3,117,099 (Proops et al.).

Other epoxy-containing materials that are useful include glycidyl ether monomers of Formula I

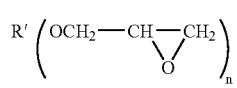

where R' is a radical having a valency of n where n is an integer of 1 to 6. R' can be either an aliphatic group, aromatic group, or combination thereof. Exemplary epoxides are glycidyl ethers of polyhydric phenols that can be obtained by reacting a polyhydric phenol with an excess of a chlorohydrin such as epichlorohydrin (for example, the diglycidyl ether of 2,2-bis-(2,3-epoxypropoxyphenol)-propane). Additional examples of epoxides of this type are described in U.S. Pat.

No. 3,018,262, and in *Handbook of Epoxy Resins*, Lee and Neville, McGraw-Hill Book Co., New York (1967).

Numerous commercially available epoxy resins can be utilized. In particular, epoxides that are readily available include octadecylene oxide, epichlorohydrin, styrene oxide, vinyl cyclohexene oxide, glycidol, glycidyl methacrylate, diglycidyl ethers of Bisphenol A (for example, EPON 828, EPON 825, EPON 1004, and EPON 1001 from Resolution Performance Products, Houston, Tex. as well as DER 221, DER 332, and DER 334 from Dow Chemical Co., Midland, Mich.), vinylcyclohexene dioxide (for example, ERL 4206 from Dow Chemical, Midland, Mich.), 3,4-epoxycyclohexy-lmethyl-3,4-epoxycyclohexene carboxylate (for example, ERL 4221, CYRACURE UVR 6110, and CYRACURE UVR 6105 from Dow Chemical), 3,4-epoxy-6-methylcyclohexyl-methyl-3,4-epoxy-6-methyl-cyclohexene carboxylate (for example, ERL 4201 from Dow Chemical), bis(3,4-epoxy-6-methylcyclohexylmethyl)adipate (for example, ERL 4289 from Dow Chemical), bis(2,3-epoxycyclopentyl)ether (for example, ERL 0400 from Dow Chemical), aliphatic epoxy modified from polypropylene glycol (for example, ERL 4050 and ERL 4052 from Dow Chemical), dipentene dioxide (for example, ERL 4269 from Dow Chemical), epoxidized polyb-utadiene (for example, OXIRON 2001 from FMC Corp.), silicone resin containing epoxy functionality, flame retardant epoxy resins such as brominated bisphenol-type epoxy resins (for example, DER 580 from Dow Chemical), 1,4-butanediol diglycidyl ether of phenol formaldehyde novolak (for example, DEN 431 and DEN 438 from Dow Chemical), resorcinol diglycidyl ether (for example, KOPOXITE from Koppers Company, Inc.), bis(3,4-epoxycyclohexyl)adipate (for example, ERL 4299 or CYRACURE UVR 6128 from Dow Chemical), 2-(3,4-epoxycyclohexyl-5,5-spiro-3,4-ep-oxy)cyclohexane-meta-dioxane (for example, ERL-4234 from Dow Chemical), vinylcyclohexene monoxide, 1,2-ep-oxyhexadecane (for example, CYRACURE UVR-6216 from Dow Chemical), alkyl glycidyl ethers such as alkyl $C_8$-$C_{10}$ glycidyl ether (for example, HELOXY MODIFIER 7 from Resolution Performance Products), alkyl $C_{12}$-$C_{14}$ glycidyl ether (for example, HELOXY MODIFIER 8 from Resolution Performance Products), butyl glycidyl ether (for example, HELOXY MODIFIER 61 from Resolution Performance Products), cresyl glycidyl ether (for example, HELOXY MODIFIER 62 from Resolution Performance Products), p-tert-butylphenyl glycidyl ether (for example, HELOXY MODIFIER 65 from Resolution Performance Products), polyfunctional glycidyl ethers such as diglycidyl ether of 1,4-butanediol (for example, HELOXY MODIFIER 67 from Resolution Performance Products), diglycidyl ether of neo-pentyl glycol (for example, HELOXY MODIFIER 68 from Resolution Performance Products), diglycidyl ether of cyclo-hexanedimethanol (for example, HELOXY MODIFIER 107 from Resolution Performance Products), trimethylol ethane triglycidyl ether (for example, HELOXY MODIFIER 44 from Resolution Performance Products), trimethylol propane triglycidyl ether (for example, HELOXY 48 from Resolution Performance Products), polyglycidyl ether of an aliphatic polyol (for example, HELOXY MODIFIER 84 from Resolution Performance Products), polyglycol diepoxide (for example, HELOXY MODIFIER 32 from Resolution Performance Products), bisphenol F epoxides (for example, EPON 1138 from Resolution Performance Products and GY-281 from Ciba-Geigy Corp.), and 9,9-bis[4-(2,3-epoxypropoxy)-phenylfluorenone (for example, EPON 1079 from Resolution Performance Products).

Other useful epoxy resins include copolymers of acrylic acid esters of glycidol (such as glycidyl acrylate and glycidyl methacrylate) with one or more copolymerizable vinyl compounds. Examples of such copolymers are 1:1 styrene-glycidyl methacrylate and 1:1 methyl methacrylate-glycidyl acrylate. Other useful epoxy resins are well known and contain such epoxides as epichlorohydrins, alkylene oxides (for example, propylene oxide), styrene oxide, alkenyl oxides (for example, butadiene oxide), and glycidyl esters (for example, ethyl glycidate).

Still other useful epoxy resins include epoxy-functional silicones such as those described in U.S. Pat. No. 4,279,717 (Eckberg et al.), which are commercially available from the General Electric Company. These epoxy resins are polydim-ethylsiloxanes in which 1 to 20 mole percent of the silicon atoms have been substituted with epoxyalkyl groups (preferably, epoxy cyclohexylethyl, as described in U.S. Pat. No. 5,753,346 (Leir et al.)).

Blends of various epoxy-containing materials can also be utilized. Suitable blends can include two or more weight average molecular weight distributions of epoxy-containing compounds such as low molecular weight epoxides (e.g., having a weight average molecular weight below 200 g/mole), intermediate molecular weight epoxides (e.g., having a weight average molecular weight in the range of about 200 to 1000 g/mole), and higher molecular weight epoxides (e.g., having a weight average molecular weight above about 1000 g/mole). Alternatively or additionally, the epoxy resin can contain a blend of epoxy-containing materials having different chemical natures such as aliphatic and aromatic or different functionalities such as polar and non-polar. Other cationically-reactive polymers (such as vinyl ethers and the like) can additionally be incorporated, if desired.

In some embodiments, the adhesive composition contains at least 25 weight percent, at least 30 weight percent, at least 35 weight percent, or at least 40 weight percent epoxy resin based on the weight of the adhesive composition. Some adhesive compositions contain up to 50 weight percent, up to 45 weight percent, or up to 40 weight percent epoxy resin. For example, the adhesive compositions can contain 25 to 50 weight percent, 25 to 45 weight percent, 25 to 40 weight percent, or 30 to 50 weight percent epoxy resin based on the weight of the adhesive composition.

The adhesive composition often contains at least 50 weight percent, at least 55 weight percent, at least 60 weight percent, or at least 70 weight percent surface-modified silica nanoparticles based on the weight of the adhesive composition. Some adhesive compositions contain up to 75 weight percent, up to 70 weight percent, up to 65 weight percent, or up to 60 weight percent surface-modified silica nanoparticles. For example, the adhesive composition can contain 50 to 75 weight percent, 50 to 70 weight percent, 50 to 65 weight percent, 55 to 65 weight percent, or 55 to 75 weight percent surface-modified silica nanoparticles.

The adhesive composition can further include a polyol in addition to the epoxy resin. As used herein, the term "polyol" refers to an organic compound having two or more hydroxy groups. The polyol can be added as a chain extender for the epoxy resin and can be a source of protons for the cationic polymerization reaction. When a polyol is added, any process used to remove water and the optional water-miscible solvent is conducted either prior to the addition of the polyol or under conditions that do not remove the polyol.

Suitable diols (i.e., polyols with two hydroxy groups) include materials ranging in size from ethylene glycol to a polyethylene glycol. Exemplary diols and polyols include, but are not limited to, 1,2-ethanediol, 1,2-propanediol, 1,3-propanediol, 1,4-butanediol, 1,3-butanediol, 2-methyl-1,3-propanediol, 2,2-dimethyl-1,3-propanediol, 2-ethyl-1,6-hexanediol, 1,5-pentanediol, 1,6-hexanediol, 1,8-octanediol, neopentyl glycol, glycerol, trimethylolpropane, 1,2,6-hexanetriol, trimethylolethane, pentaerythritol, quinitol, mannitol, sorbitol, diethylene glycol, triethylene glycol, tetraethylene glycol, glycerine, 2-ethyl-2-(hydroxymethyl)-1,3-propanediol, 2-ethyl-1,3-pentanediol, 1,4-cyclohexanedimethanol, and 1,4-benzene-dimethanol. Other useful polyols are disclosed in U.S. Pat. No. 4,503,211 (Robins).

Higher molecular weight polyols include the polyethylene oxide and polypropylene oxide polymers in the molecular weight ($M_n$) range of 200 to 20,000 such as polyethyleneoxide materials available from Dow Chemical Co., Midland, Mich. under the trade designation CARBOWAX; carpolactone polyols in the molecular weight ($M_n$) range of 200 to 5,000 such as polyol materials available from Dow Chemical Co., Midland, Mich. under the trade designation TONE; polytetramethylene ether glycol in the molecular weight ($M_n$) range of 200 to 4,000 such as the materials available from DuPont, Wilmington, Del. under the trade designation TERATHANE and from BASF, Mount Olive, N.J. under the trade designation POLYTHF 250; polyethylene glycol such as material available from Dow Chemical Co., Midland, Mich. under the trade designation PEG 200; hydroxy-terminated polybutadiene resins such as materials from Atofina, Philadelphia, Pa. under the trade designation POLYBD; phenoxy resins such as those commercially available from Phenoxy Associates, Rock Hill, S.C.; and similar materials supplied by other manufacturers.

When a polyol is present in the adhesive composition, the polyol is typically present in an amount up to 20 weight percent, up to 10 weight percent, or up to 5 weight percent based on the weight of the adhesive composition. The polyol can be present in an amount of at least 0.5 weight percent, at least 1 weight percent, at least 2 weight percent, or at least 3 weight percent based on the weight of the adhesive composition. The polyol is often present in an amount of 0 to 20 weight percent, 0.5 to 20 weight percent, 1 to 20 weight percent, 0.5 to 10 weight percent, 1 to 10 weight percent, 0.5 to 5 weight percent, or 1 to 5 weight percent based on the weight of the adhesive composition.

In some embodiments, the epoxy resin is a cycloaliphatic epoxy resin, glycidyl ether epoxy such as a diglycidyl ether of bisphenol A, or a combination thereof. A reactive diluent may be added to lower the viscosity to prepare a flowable adhesive composition. As used herein, the term "reactive diluent" refers to an epoxy resin that is added to lower the viscosity. For example, the epoxy resins commercially available under the trade designation HELOXY MODIFIER from Resolution Performance Products (e.g., HELOXY MODIFIER 7, 8, 61, 62, 65, 67, 68, 107, 44, 48, 84, or 32) are often combined as a reactive diluent with a cycloaliphatic epoxy resin or diglycidyl ether of Bisphenol A. Additionally, a polyol can be added. Some adhesive compositions contain up to 50 weight percent cycloaliphatic epoxy resin, glycidyl ether epoxy, or combination thereof, up to 20 weight percent reactive diluent, and up to 20 weight percent polyol based on the weight of the adhesive composition.

More particularly, exemplary adhesive compositions often contain 50 to 75 weight percent surface-modified silica nanoparticles, 20 to 50 weight percent cycloaliphatic epoxy resin, glycidyl ether epoxy, or combinations thereof, 0 to 20 weight percent reactive diluent, and 0 to 20 weight percent polyol. Some adhesive compositions contain 50 to 75 weight percent surface-modified silica nanoparticles, 20 to 50 weight percent cycloaliphatic epoxy resin, glycidyl ether epoxy, or combinations thereof, 1 to 20 weight percent reactive diluent, and 0 to 10 weight percent polyol. Other adhesive compositions contain 50 to 75 weight percent surface-modified silica nanoparticles, 25 to 50 weight percent cycloaliphatic epoxy resin, glycidyl ether epoxy, or combinations thereof, 5 to 20 weight percent reactive diluent, and 0.5 to 10 weight percent polyol.

A photoinitiator is added to the dispersion to cure the epoxy resin. Most of the water and optional water-miscible solvent is usually removed prior to addition of the photoinitiator. In some embodiments, the dispersion is essentially free of water and optional water-miscible solvent prior to the addition of the photoinitiator. The adhesive resin typically contains less than 1 weight percent water, less than 1 weight percent water-miscible solvent, or a combination thereof. Greater than 1 weight percent water or greater than 1 weight percent of a protic solvent can often interfere with the cationic polymerization reaction (i.e., the curing reaction). That is, the adhesive composition typically contains less than 1 weight percent, less than 0.5 weight percent, less than 0.3 weight percent, less than 0.2 weight percent, or less than 0.1 weight percent water based on the weight of the adhesive composition. Further, the adhesive composition contains less than 1 weight percent, less than 0.5 weight percent, less than 0.3 weight percent, less than 0.2 weight percent, or less than 0.1 weight percent optional water-miscible solvent based on the weight of the adhesive composition.

Besides removing most (e.g., substantially all) of the water and optional water-miscible solvent, any basic material that may be present is typically removed. The adhesive composition is substantially free of amines, ammonia, ammonium hydroxide, alkali metal hydroxides (e.g., sodium hydroxide, potassium hydroxide, or lithium hydroxide), or alkaline earth hydroxides (e.g., calcium hydroxide or magnesium hydroxide). As used in reference to basic material, the term "substantially free" refers to a composition that contains less than 1 weight percent, less than 0.5 weight percent, less than 0.2 weight percent, or less than 0.1 weight percent basic material based on the weight of the composition. The basic material can be removed either before or after addition of the surface-modified silica nanoparticles to the epoxy resin. The basic material is often removed after formation of the surface-modified silica nanoparticles (i.e. before addition of the surface-modified silica nanoparticles to the epoxy resin). If the basic material is volatile such as an amine or ammonia, it can be removed under the same conditions used to remove water and the optional water-miscible solvent. Alternatively, the basic material can also be removed, for example, using an ion exchange resin. For example, any alkaline metal hydroxides, alkaline earth hydroxides, and ammonium hydroxide can be treated with a cation exchange resin in hydrogen form. Suitable cation exchange resins often have sulfonic acid functionality. The cation exchange resin can usually be removed by filtration.

Any suitable photoinitiator can be used in the adhesive composition. In many embodiments, the photoinitiator is a single-component system such as an ultraviolet cationic photoinitiator. Suitable ultraviolet cationic photoinitiators often include a sulfonium salt or an iodonium salt. Exemplary triarylsulfonium salts include triarylsulfonium hexafluorophosphate and triarylsulfonium hexafluoroantimonate such as those commercially available from Dow Chemical Co., Midland, Mich. under the trade designation CYRACURE (UVI-6976, UVI-6992, UVI-6974, or UVI-6990) and from Sartomer, Exton, Pa. under the trade designation SARCAT (K185 or SR1010). Exemplary iodonium salts typically are diaryliodonium salts such as those further described in U.S. Pat. No. 4,494,403 (Smith), U.S. Pat. No. 4,250,053 (Smith), U.S. Pat. No. 3,808,006 (Smith), U.S. Pat. No. 3,741,769 (Smith), and U.S. Pat. No. 3,729,313 (Smith). The iodonium salts can be a simple salt containing an anion such as Cl⁻, Br⁻, I⁻, or $C_4H_5SO_3^-$ or a metal complex salt containing an anion such as $SbF_6^-$, $PF_6^-$, $BF_4^-$, tetrakis(perfluorophenyl)borate, $SbF_5OH^-$, or $AsF_6^-$. The cation of the iodonium salt is often diphenyliodonium. Mixtures of iodonium salts can be used, if desired.

In other embodiments, the photoinitiator is a multiple-component system. The multiple-component system can include an electron acceptor and a photosensitizer or can include an electron acceptor, electron donor, and photosensitizer. Suitable multiple-component photoinitiator systems often include an electron acceptor that is an iodonium salt such as a diaryliodonium salt. Multiple-component photoinitiator systems are further described, for example, in International Patent Application Publication WO 2005/066672 (Anderson et al.) and WO 2000/06661 (Kawate et al.); and U.S. Patent Application Publications 2004/0068023 A1, (Leatherdale et al.), 2004/0067450 A1 (Leatherdale et al.), and 2005/0124712 A1 (Anderson et al.).

The photoinitiator is typically present in an amount of at least 0.1 weight percent, at least 0.2 weight percent, at least 0.3 weight percent, or at least 0.5 weight percent based on the weight of the adhesive composition. If the concentration is less than about 0.1 weight percent, the polymerization rate may be unacceptably low. The adhesive composition often contains up to 3 weight percent, up to 2 weight percent, or up to 1 weight percent photoinitiator. Adding greater than 3 weight percent photoinitiator often does not further increase the polymerization rate. In some adhesive compositions, the photoinitiator is present in an amount in the range of 0.1 to 3 weight percent, in the range of 0.5 to 3 weight percent, or in the range of 0.1 to 2 weight percent based on the weight of the adhesive composition.

After addition of the photoinitiator, the flowable adhesive composition is positioned between a first article and a second article and then cured in the presence of actinic radiation to bond the first article to the second article. The adhesive composition is positioned to touch or positioned to flow so as to touch both the first article and the second article. The flowable adhesive composition can be positioned between the first and second article using any technique known in the art. For example, a syringe or another suitable application device can be used to direct the adhesive composition to a specific location and to control the amount of adhesive composition used. In some embodiments, such as when the first article is an optical fiber, the adhesive composition preferably wicks the optical fiber prior to being cured.

The adhesive composition is cured upon exposure to a suitable wavelength of actinic radiation. The photoinitiators are often activated by exposure to ultraviolet light. Any source of ultraviolet light known in the art can be used. Suitable ultraviolet light sources include, but are not limited to, mercury arcs, low-pressure mercury lamps, medium-pressure mercury lamps, high-pressure mercury lamps, plasma arcs, ultraviolet light emitting diodes, and ultraviolet light emitting lasers. Exemplary commercially available ultraviolet light sources include Model LCU 750 medium pressure mercury lamp from UVEXS (Sunnyvale, Calif.), Model QC 1202 ultraviolet lamp from RPC Equipment (Plainfield, Ill.), and RAYONET Model RPR 100 ultraviolet lamp from Southern New England Ultraviolet Company (Hamden, Conn.). Other exemplary ultraviolet light sources are spot curing systems such as those commercially available from EXFO Omnicure (Vanier, Quebec, Canada), Fusion UV Systems, Inc. (Gaithersburg, Md.), and Jenton International UV (Hampshire, United Kingdom). Still other exemplary ultraviolet light sources are flood curing systems such as those commercially available from Dymax Corporation (Torrington, Conn.), Fusion UV Systems, Inc. (Gaithersburg, Md.), and UV Process Supply, Inc. (Chicago, Ill.).

The method of bonding described herein is particularly well suited for various optical applications. For example, the method of bonding can be used to bond a first optical fiber to a second optical fiber or to bond a first optical fiber to an optical device such as an optical waveguide, optical sensor, or optical splitter. The method of bonding can be used to form, for example, a fiber pigtailed device. As used herein, the term "fiber pigtailed device" refers to an optically functional device with one or more optical fibers aligned to couple light to or from the optically active region of the device and secured to the optically active region of the device. The fiber pigtailed device can be, for example, a laser, photodetector, integrated optical waveguide device, or the like.

In many optical applications, the adhesive bond is desirably thermally stable. The adhesive bond desirably does not allow movement of the optical fibers during temperature cycling. A movement of even 2.3 micrometers can translate into a variation of 1.0 decibels of insertion loss. For a fiber pigtailed device, insertion loss (L) is defined as the total optical loss occurring between the input and an output fiber, expressed in decibels as follows:

$$L = 10 \log_{10}(P_{in}/P_{out})$$

where $P_{in}$ is the optical power at the input side of the device and $P_{out}$ is the optical power at the output side of the device. The system in which the device is used typically determines what is an acceptable temperature stability. As a specific example, for passive optical splitters used in optical fiber telecommunications networks, optical performance requirements are summarized in the Telcordia GR-1209 standard "Generic Requirements for Passive Optical Components" published in March 2001 by Telcordia Technologies (Piscataway, N.J.). In this standard, the loss variation allowable during temperature cycling is not specified directly, but rather maximum total insertion losses are given. Combined with other requirements on the devices, the specifications result in allowable variations of approximately +/−0.2 dB (i.e., 0.4 dB peak-to-peak) as the device is cycled through a temperature range of −40° C. to +85° C.

In addition to providing a thermally stable bond, the method usually provides an optically clear bond that allows high optical transmission. As used herein, the term "optically clear" refers to a material that is clear to the human eye. An optically clear bond often has a luminous transmission of at least about 90 percent, a haze of less than about 2 percent, and opacity of less than about 1 percent in the 400 to 700 nm wavelength range. Both the luminous transmission and the haze can be determined using, for example, the method of ASTM-D 1003-95. The transmission of light is often at least 85 percent, at least 90 percent, at least 95 percent, or at least 98 percent for wavelengths in the range suitable for optical communication applications. In some embodiments, at least 85 percent, at least 90 percent, at least 95 percent, or at least 98 percent of light in the wavelength range of 800 to 1650 nanometers is transmitted.

There are many commercially available adhesives that have a low coefficient of thermal expansion. The low thermal expansion in adhesive is generally obtained by the incorporation of conventional fillers such as alumina, quartz or other inorganic particles. These conventional fillers are unacceptable for applications where optical transmission is required. Because the average size of these fillers is generally larger than optical wavelengths (e.g., wavelengths in the visible or infrared regions of the electromagnetic spectrum), the fillers scatter the light and prevent the transmission of the light through the adhesive. If smaller inorganic fillers are used, such as fumed silica, it has been difficult to add them in a high enough concentration to reduce the thermal expansion of the adhesive while maintaining a fluid adhesive composition. These smaller inorganic fillers frequently impart haze to the adhesive because of aggregation or agglomeration of the filler particles. In contrast, as provided herein, non-aggregated, surface modified silica nanoparticles can be used to provide an adhesive composition that is optically clear and that does not scatter optical wavelengths.

For the methods described herein, the index of refraction of the resulting bond often matches the index of refraction for the first article (e.g., an optical fiber), the index of refraction for the second article (e.g., an optical device or second optical fiber), or the index of refraction for both the first and second articles. The index of refraction is often greater than 1.40, greater than 1.42, greater than 1.44, or greater than 1.46 for wavelengths of light greater than 1000 nanometers. The temperature dependence for the index of refraction can match that for the first article, the second article, or both the first and second articles.

The cured adhesive composition often has a glass transition temperature (Tg) greater than 60° C. and a coefficient of thermal expansion less than 80 parts per million. The glass transition temperature is often greater than 80° C., greater than 100° C., greater than 110° C., or greater than 120° C. The coefficient of thermal expansion is often less than 70 parts per million, less than 60 parts per million, less than 50 parts per million, or less than 40 parts per million.

Many electronic substrates are inorganic and have low coefficient of thermal expansions that are not closely matched to the coefficient of thermal expansion of many commercially available adhesive compositions. Exemplary substrates can be semiconductor materials (e.g., silicon or gallium arsenide), metals (e.g., copper or lead), or ceramic materials. A large difference in the coefficient of thermal expansion can result in loss of bonding of the adhesive to the substrate or cracking of the substrate. In contrast, the bonding methods described herein use adhesive compositions having a low coefficient of thermal expansion and are particularly well suited for bonding an article to inorganic substrates.

The bonding method also can be particularly well suited to applications requiring low shrinkage, low stress buildup, and low movement of the articles being bonded together during and after the adhesive composition is cured.

EXAMPLES

These examples are for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
| --- | --- |
| ERL-4221E | A cycloaliphatic epoxy resin commercially available from Dow Chemical, Midland, MI. |
| HELOXY-107 | A glycidyl ether epoxy commercially available from Resolution Performance Products, Houston, TX that is used to lower the viscosity of the epoxy resin. |
| UVI-6976 | A cationic photo initiator commercially available from Dow Chemical, Midland, MI. |
| Silica Nanoparticles 1 | Silica nanoparticle water-based sol (approximately 40 weight percent solids) having an average particle size of 75 nanometers that are commercially available from Nalco Chemical, Naperville, IL as NALCO 2329. The silica content was about 40 weight percent based on the weight of the sol. The silica nanoparticles were surface modified by the process described in U.S. Pat. No. 5,648,407 as shown in the Preparative Examples section below. |
| Silica Nanoparticles 2 | Silica nanoparticle water-based sol (approximately 40 weight percent solids) having an average particle size of 83 nanometers that are commercially available from Nalco Chemical, Naperville, IL as NALCO 2329. The silica content was about 40 weight percent based on the weight of the sol. The silica nanoparticles were surface modified by the process described in U.S. Pat. No. 5,648,407 as shown in the Preparative Examples section below. |
| Silica Nanoparticles 3 | Silica nanoparticle water-based sol (approximately 27 weight percent solids) having an average particle size of 60 nanometers that are commercially available from Nalco Chemical, Naperville, IL as NALCO 03TS097. The silica content was about 27 weight percent based on the weight of the sol. The silica nanoparticles were surface modified by the process described in U.S. Pat. No. 5,648,407 as shown in the Preparative Examples section below. |
| AMBERLITE IR-120H PLUS | Gel-type cation exchange resin that is commercially available from Alfa Aesar (Ward Hill, MA) or Sigma-Aldrich. The cation exchange resin has sulfonic acid functionality and is in the hydrogen form. |
| Adhesive 1 | Prepared as described in the Preparative Example section below. |
| Adhesive 2 | Prepared as described in the Preparative Example section below. |
| Adhesive 3 | Prepared as described in the Preparative Example section below. |
| Adhesive 4 | Prepared as described in the Preparative Example section below. |
| Adhesive 5 | OPTODYNE UV 2100, commercially available from Daikin America Inc., Orangeburg, NY. |

Table of Abbreviations (continued)

| Abbreviation or Trade Designation | Description |
|---|---|
| Adhesive 6 | OPTODYNE UV 3100, commercially available from Daikin America Inc., Orangeburg, NY. |
| Adhesive 7 | AC A535-AN, commercially available from Addison Clear Wave, Evanston, IL. |
| Surface Treatment Agent-1 ("Agent-1") | Phenyltrimethoxysilane, commercially available from United Chemical Technologies, Inc., Bristol, PA. |
| Surface Treatment Agent-2 ("Agent-2") | PEG-Silane, see Preparative Examples section below. |

Test Methods

Thermal Cycling of Bonded Fiber Optic Assemblies

To characterize the thermal stability of the cured adhesives, straight waveguide chips were bonded to fiber array sets using an adhesive composition in the light path as described for each example. Telcordia Technologies has published a set of specifications used throughout the fiber optic industry as guidelines for testing passive optical components (the version used was Telcordia GR-1209 specification "Generic Requirements for Passive Optical Components," Issue 3, March 2001). The standard specification for thermal cycling testing for a bonded fiber optic assembly is a cycle from +85° C. to −40° C. with a rate of temperature change of 1° C. per minute and dwell times of 15 minutes or greater at the extremes. Samples go through 10 temperature cycles or 50 hours.

For testing, the fiber pigtails for both input and output were connected to light sources and detectors and a computer system to monitor insertion loss during the duration of the cycling. The system monitored eight separate bonded waveguide/fiber channels plus a reference fiber at 1550 nm and 1310 nm wavelengths. All samples tested had 16 fibers per end and waveguides on a 127 micrometer pitch. During the temperature cycling, 8 channels were typically monitored, although not all channels were always functional so the number of channels used for each experiment was noted. The results are presented as the peak to peak variation for the channels in units of decibels.

Preparative Example 1

Preparation of PEG-Silane 3-triethoxysilylpropyl isocyanate (41 grams) was added over a 5 minute period to poly(ethylene glycol) methyl ether (96 grams) and tin(dibutyl dilaurate) (4 drops of commercially available material from Strem Chemicals, Newburyport, Mass.) within an amber jar. The resulting mixture was stirred overnight. The consumption of all of the isocyanate was confirmed by obtaining an IR spectrum of the resulting liquid to confirm the absence of NCO peaks.

Preparative Example 2

Adhesive 1

850 grams of an aqueous mixture of Silica Nanoparticles 1 was placed in a beaker. Under medium agitation, pre-washed AMBERLITE IR-120 PLUS cation exchange resin was slowly added until the pH measured between 2 and 3 using pH paper. After stirring for 16 hours at room temperature (i.e., 20 to 25° C.), the mixture was filtered through a 10 micrometer nylon SPECTRAMESH sheet (commercially available from Spectrum Laboratories, Laguna Hills, Calif.) to remove the ion exchange resin. The solids content was determined. 808 grams of this ion exchanged mixture was placed in a round bottom flask. Under medium agitation, 800 grams of 1-methoxy-2-propanol was added followed by the quick addition of enough aqueous ammonium hydroxide to bring the pH to between 9 and 9.5. A premixed solution of 800 grams of 1-methoxy-2-propanol and 9.1 grams of Surface Treatment Agent-1 (0.15 mmoles silane/gram of dry silica) was then added. The resulting mixture was heated at 90 to 95° C. for approximately 22 hours and then air dried to a white, free-flowing solid. The treated silica was dispersed in acetone using a high shear Silverson L4R mixer set at ¾ speed for 2 minutes. The resulting silica/acetone mixture was covered, allowed to sit for five hours, and then filtered through 1 micrometer glass syringe filter. The percent silica solids were determined. 229 grams of this silica/acetone mixture (48 grams silica nanoparticles) was added to 22.4 grams of ERL 4221E and 1.23 grams of 1,4-butanediol. The dispersion was mixed well and vacuumed stripped at 70 to 100° C. to remove the majority of the solvents (Buchi rotary evaporator with a water aspirator). 7.4 grams of HELOXY 107 was added and the dispersion was further stripped to finish removing volatiles using a vacuum pump. After cooling to room temperature, UVI-6976 (2 weight percent of the 50/50 catalyst/propylene carbonate solution based on organic portion of the formulation only) was added and the adhesive composition was mixed using a FlakTek DAC 150 FVZ speed mixer. The adhesive composition was packaged in 5 milliliter black syringes.

Preparative Example 3

Adhesive 2

An aqueous mixture of 950 grams of Silica Nanoparticles 2 was placed in a beaker. Under medium agitation, pre-washed AMBERLITE IR-120 Plus cation exchange resin was slowly added until the pH measured between 2 and 3 using pH paper. After stirring a minimum of one hour at room temperature, the mixture was filtered through a 53 micrometer nylon mesh to remove the ion exchange resin. The solids content was determined. 900 grams of this ion exchanged solution was placed in a round bottom flask. Under medium agitation, 400 grams of 1-methoxy-2-propanol was added followed by the quick addition of enough aqueous ammonium hydroxide to bring the pH to between 9 and 9.5. A premixed solution of 1,100 grams of 1-methoxy-2-propanol and 10.4 grams of Surface Treatment Agent-1 (0.146 mmoles silane/gram of dry silica) was then added. The resulting mixture was heated at 95° C. for approximately 22 hours then air dried to a white free flowing solid. The treated silica was dispersed in acetone using a high shear Silverson L4R mixer set at ¾ speed for 1 minute. The resulting mixture was covered, allowed to sit for one hour, and then filtered through a 53 micrometer nylon mesh. The percent silica solids were determined. 290 grams of the silica/acetone mixture (36 grams of silica nanoparticles) was added to 17.5 grams of ERL 4221E, 0.92 grams of 1,4-butanediol and 5.54 grams of HELOXY 107. The dispersion was mixed well, vacuumed stripped at 75° C. to remove the majority of the solvents (Buchi rotary evaporator with a water aspirator), and then further stripped at 100° C. using a vacuum pump to finish removing the volatiles. After cooling to room temperature, UVI-6976 (2 weight percent of the 50/50 catalyst/ propylene carbonate solution based on organic portion of formulation only) was added and the adhesive composition was mixed using a FlakTek DAC 150 FVZ speed mixer. The adhesive composition was then packaged in 10 milliliter black syringes.

Preparative Example 4

Adhesive 3

An aqueous mixture of 650 grams of Silica Nanoparticles 3 was placed in a beaker. Under medium agitation, prewashed AMBERLITE IR-120 Plus cation exchange resin was slowly added until the pH measured between 2 and 3 using pH paper. After stirring a minimum of one hour at room temperature, the mixture was filtered through a 53 micrometer nylon mesh to remove the ion exchange resin. The solids content was determined. 400 grams of the ion exchanged solution was placed in a round bottom flask. Under medium agitation, 150 grams of 1-methoxy-2-propanol was added followed by the quick addition of enough aqueous ammonium hydroxide to bring the pH to between 9 and 9.5. A premixed solution of 450 grams of 1-methoxy-2-propanol and 4.5 grams of Surface Treatment Agent-1 (0.21 mmoles silane/gram of dry silica) was then added. The resulting mixture was heated at 95° C. for approximately 22 hours and then air dried to a white free flowing solid. The treated silica was dispersed in acetone using a high shear Silverson L4R mixer set at ¾ speed for 1 minute. The resulting mixture was covered, allowed to sit for one hour, and then filtered through a 53 micrometer nylon mesh. The silica solids were determined. 225 grams of the silica/acetone mixture (36.5 grams of silica nanoparticles) was added to 17.5 grams of ERL 4221E, 0.92 grams of 1,4-butanediol, and 5.54 grams of HELOXY 107. The dispersion was mixed well, vacuumed stripped at 75° C. to remove the majority of the solvents (Buchi rotary evaporator with a water aspirator), and then further stripped at 100° C. using a vacuum pump to finish removing the volatiles. After cooling to room temperature, UVI-6976 (2 weight percent of the 50/50 catalyst/propylene carbonate solution based on organic portion of formulation only) was added and the adhesive composition was mixed using a FlakTek DAC 150 FVZ speed mixer. The adhesive composition was then packaged in 10 milliliter black syringes.

Preparative Example 5

Adhesive 4

An aqueous solution of 800 grams of Silica Nanoparticles 2 was placed in a beaker. Under medium agitation, prewashed AMBERLITE IR-120 Plus cation exchange resin was slowly added until the pH measured between 2 and 3 using pH paper. After stirring a minimum of one hour at room temperature, the solution was filtered through a 53 micrometer nylon mesh to remove the cation exchange resin. The solids content was determined. 740 grams of the ion exchanged mixture was placed in a round bottom flask. Under medium agitation, 200 grams of 1-methoxy-2-propanol was added followed by the quick addition of enough aqueous ammonium hydroxide to bring the pH to between 9 and 9.5. A premixed solution of 550 grams of 1-methoxy-2-propanol and 4.45 grams of Surface Treatment Agent-1 and 17.7 grams of Surface Treatment Agent-2 (each silane was 0.075 mmoles silane/gram of dry silica) was added. The resulting mixture was heated at 90 to 95° C. for approximately 22 hours and then air dried to a white free-flowing solid. Half of the powder was water washed using deionized water and then air dried. The silane treated, water washed powder was dispersed in acetone using a high shear Silverson L4R mixer set at ¾ speed for 1 minute. The resulting mixture was covered, allowed to sit for one hour, and filtered through a 53 micrometer nylon mesh. The solids content was determined. 206.2 grams of the silica/acetone mixture (35 grams of silica nanoparticles) was added to 13.7 grams of ERL 4221E, 0.72 grams of 1,4-butanediol, and 4.34 grams of HELOXY 107. The dispersion was mixed well, vacuumed stripped at 60° C. to remove the majority of the solvents (Buchi rotary evaporator with a water aspirator), and then further stripped at roughly 100° C. using a vacuum pump to finish removing the volatiles. After sitting overnight to make sure the dispersion was free of moisture, the formulation was heated in a 50° C. oven for one hour. After cooling to room temperature, UVI-6976 (2% of the 50/50 catalyst/propylene carbonate solution based on organic portion of formulation only) was added and the adhesive composition was mixed using a FlakTek DAC 150 FVZ speed mixer. The adhesive composition was packaged in 10 milliliter black syringes.

Examples 1-4 and Comparative Example C1-C3

Various adhesives were tested for their performance in fiber optic assemblies. The data for these adhesives are shown in Table 1. For each example, fiber optic assemblies were prepared and tested by thermal cycling using the test method outlined above. The assemblies used in the temperature cycling testing were prepared by bonding cantilevered fiber arrays (CFAs) with fiber pigtails to optical waveguide chips having a corresponding array of straight waveguides with etched v-grooves aligned to the waveguide ends. The waveguide chips were prepared as described in US Patent Publication 2005/0284181 (Smith et al.). Each CFA had a silicon base with an array of v-grooves and a flat silica glass top. Stripped fibers from an optical fiber cable such as a fiber ribbon cable were disposed in the v-grooves of the CFA and the top sandwiches the stripped optical fibers in each v-groove. The glass top and fiber ends were cantilevered (i.e. protrude over the edge of the silicon base), so that the fiber ends could be inserted into the v-grooves on the optical waveguide chips. Mating of the CFA with the optical waveguide chip was performed in a bonder that allowed precise placement of the CFA fibers in the optical waveguide chip v-grooves, adhesive dispensing, and thermal cure. The bonder had a stationary thermode with an integrated vacuum chuck to hold the waveguide chip in place. The CFA was clamped in a 5-axis translation stage (i.e., x, y, z, pitch and yaw). The fibers were positioned over the v-grooves in the waveguide chip and adjusted parallel and centered on the v-grooves. The fibers were then lowered into the v-grooves until the fiber array was seated and the CFA cover was parallel to the waveguide surface. The waveguide/fiber gap was set at 8 micrometers to allow for thermal expansion. The bond head was lowered onto the CFA cover pressing the fibers into the v-grooves of the waveguide chip. The optical adhesive was applied to the fiber/waveguide interface and flowed down the fiber/v-groove voids filling the waveguide/CFA gap. UV light was applied to initiate cure, followed by heat to complete the cure. On completion of the cure cycle, the heat was removed and the assembly was allowed to cool under bond head pressure. The cantilevered fiber arrays are further described in U.S. Provisional Patent Applications Nos. 60/693820, 60/693847, and 60/693851, incorporated herein in their entirety.

TABLE 1

| Example | Adhesive | Viscosity (Pa s) | $T_g$ (° C.) | Index of Refraction |
|---|---|---|---|---|
| 1 | Adhesive 1 | NA | 182 | 1.467 |
| 2 | Adhesive 2 | 18 | 179 | NA |
| 3 | Adhesive 3 | NA | 193 | NA |
| 4 | Adhesive 4 | 70 | NA | NA |
| C1 | Adhesive 5 | 0.90 | 129 | 1.466 |
| C2 | Adhesive 6 | 0.55 | 147 | 1.480 |
| C3 | Adhesive 7 | 5.50 | 164 | 1.558 |

NA = Not available

The bonded assemblies were tested for thermal cycling using the test method outlined above. The results are shown in Table 2.

TABLE 2

| Example | Adhesive | Peak-to-peak Variation at 1550 nm Wavelength (dB) | Number of channels |
|---|---|---|---|
| 1 | Adhesive 1 | 0.3 | 7 |
| 2 | Adhesive 2 | 0.3 | 4 |
| 4 | Adhesive 4 | 0.3 | 3 |
| C1 | Adhesive 5 | 0.7 | 6 |
| C2 | Adhesive 6 | 0.5 | 5 |
| C3 | Adhesive 7 | 0.5 | 5 |

We claim:

1. A method of bonding comprising:
   preparing a flowable adhesive composition, the preparing comprising
      surface modifying silica nanoparticles, the surface modifying comprising
         providing a surface modification mixture comprising (a) silica nanoparticles; (b) a silane surface modifying agent having hydrolysable groups; (c) water, wherein the number of moles of water present in the mixture is greater than the number of moles of hydrolysable groups; and (d) an optional water-miscible solvent;
         heating the surface modification mixture to at least 50° C. to form non-aggregated, surface-modified silica nanoparticles having surface-modifier covalently attached to the silica nanoparticles;
      forming a dispersion comprising the non-aggregated, surface-modified silica nanoparticles and an epoxy resin;
      removing basic material from the surface-modified silica nanoparticles either before or after forming the dispersion;
      removing at least most of the water and the optional water-miscible solvent; and
      adding a cationic photoinitiator after the removing step;
   positioning the adhesive composition between a first article and a second article; and
   curing the adhesive composition in the presence of actinic radiation to bond the first article to the second article.

2. The method of claim 1, wherein the adhesive composition comprises 50 to 75 weight percent silica nanoparticles based on the weight of the adhesive composition.

3. The method of claim 2, wherein the adhesive composition comprises 25 to 50 weight percent epoxy resin and 0.1 to 3 weight percent cationic photoinitiator.

4. The method of claim 1, wherein the first article comprises an optical fiber.

5. The method of claim 4, wherein the fiber wicks the adhesive composition prior to curing.

6. The method of claim 1, wherein heating the surface modification mixture comprises heating to at least 50° C. for at least 5 hours.

7. The method of claim 1, wherein removing at least a portion of the water and the optional water miscible solvent comprises drying the surface-modified silica nanoparticles before forming the dispersion.

8. The method of claim 1, wherein removing at least a portion of the water and the optional water miscible solvent comprises heating the dispersion comprising the silica-modified nanoparticles and the epoxy resin.

9. The method of claim 1, wherein the adhesive composition is substantially free of water and the optional water-miscible solvent.

10. The method of claim 1, wherein the silane surface modifying agent has at least one trialkoxysilyl group or at least one trihalosilyl group.

11. The method of claim 1, wherein the silica nanoparticles have an average particle diameter in a range of 10 to 200 nanometers.

12. The method of claim 1, wherein removing the basic material comprises treating the surface-modified silica nanoparticles with an ion exchange resin.

13. The method of claim 1, wherein the adhesive composition is substantially free of amines, ammonia, alkali metal hydroxides, alkaline earth hydroxides, ammonium hydroxide, or mixture thereof.

14. The method of claim 1, wherein the epoxy resin comprises a cycloaliphatic epoxy, a diglycidyl ether of Bisphenol A, or combination thereof.

15. The method of claim 1, wherein the adhesive composition further comprises a polyol.

16. The method of claim 1, wherein the silane modifying agent comprises aryltrialkoxysilane.

17. The method of claim 1, wherein the cured adhesive composition has a refractive index that matches the first article, the second article, or a combination thereof.

18. The method of claim 1, wherein the first article comprises an optical fiber and the second article comprises an optical fiber.

19. The method of claim 1, wherein the first article comprises an optical fiber and the second article comprises an optical device.

20. The method of claim 1, wherein the adhesive composition transmits greater than 90 percent of light in a wavelength range of 800 to 1650 nanometers.

* * * * *